US006189084B1

(12) United States Patent
Kurisu (10) Patent No.: US 6,189,084 B1
(45) Date of Patent: Feb. 13, 2001

(54) DEBUGGING METHOD AND MONITORING METHOD FOR ANALYSIS INSTRUMENTS

(75) Inventor: Hiroshi Kurisu, Kyoto (JP)

(73) Assignee: Horiba, Ltd., Kyoto (JP)

( * ) Notice: Under 35 U.S.C. 154(b), the term of this patent shall be extended for 0 days.

(21) Appl. No.: 09/111,356

(22) Filed: Jul. 6, 1998

(30) Foreign Application Priority Data

Jul. 14, 1997 (JP) .................................................. 9-205317
Jul. 30, 1997 (JP) .................................................. 9-220195
Jul. 30, 1997 (JP) .................................................. 9-220196

(51) Int. Cl.[7] .................................................. G06F 11/00
(52) U.S. Cl. .............................. 712/11; 712/27; 712/32; 712/227; 395/704
(58) Field of Search .................... 712/1, 27, 227, 712/32, 11; 395/704; 364/104.9; 427/1, 2.11

(56) References Cited

U.S. PATENT DOCUMENTS

| 4,450,727 | * | 5/1984 | Reinholm et al. ................. 73/862.23 |
| 4,589,068 | | 5/1986 | Heinen, Jr. ............................. 395/704 |
| 5,473,706 | * | 12/1995 | Bacus et al. ........................... 382/133 |
| 5,811,666 | * | 9/1998 | Yamada ................................. 73/61.56 |

FOREIGN PATENT DOCUMENTS

WO/95 23374    8/1995  (WO).

OTHER PUBLICATIONS

Ken Marrin: "DSP Development Tools Engage Mainstream Designers"; Computer Design; vol. 32, No. 1, Jan. 1993, pp. 65–74; Littleton, Massachusetts US; p. 68, middle coumn, line 10–line 28.

* cited by examiner

Primary Examiner—Daniel H. Pan
Assistant Examiner—Dzung C. Nguyen
(74) Attorney, Agent, or Firm—Oppenheimer Wolff & Donnelly LLP (57) ABSTRACT

A method of debugging and a method of monitoring an analysis instrument are provided. A microcomputer of the analysis instrument is provided with a debugging personal computer connected thereto via remote communication means. The analysis instrument has detecting means for checking operation status installed therein. An operator debugs contents stored in the analysis instrument via the communication means after checking as to whether trouble exists in each device according to testing information provided by the detecting means.

10 Claims, 6 Drawing Sheets

DEBUGGING METHOD AND MONITORING METHOD FOR ANALYSIS INSTRUMENTS

FIELD OF THE INVENTION

The present invention relates to a debugging method and a monitoring method for an analysis instrument having detectors such as an infrared gas concentration detector.

BACKGROUND OF THE INVENTION

Concentrations of impurity elements (analysis value) in a metal have been determined with a metal analysis instrument by carrying out arithmetic operations with a microcomputer according to a specific arithmetic operation program on detected value obtained by a detector. In such a metal analysis instrument, there is present noise due to high-frequency emissions or large electric currents handled therein. Consequently, data stored in a hard disk or the like may easily be destroyed. As a result, analysis value may involve errors due to faults in software such as the arithmetic operation program.

One of the measures which can be taken in such a case is to dispatch a developer's programmer in the field. Another corrective measure is to investigate the cause of the problem which requires debugging through telephone communications between the programmer and the user, with the programmer using the developer's metal analysis instruments at the programmer's site to reproduce the problem in question.

However, dispatching a programmer requires a significant amount of expenditure and time. When the trouble is reproduced on the metal analysis instrument at the programmer's site, precise information cannot be communicated over the telephone, and it is difficult to reproduce the subtleties of the situation in detail. Further, after a remedy has been made, a medium for storing the software must be sent, thus incurring a transportation expenditure. Consequently, such measures as described above are not economical and are not capable of providing quick fixes for bugs.

SUMMARY OF THE INVENTION

In consideration of the situation described above, the present invention provides a method of on-line debugging for the metal analysis instrument, wherein a monitoring computer is connected to the metal analysis instrument via communication means such as public access networks. However, before debugging the arithmetic operation program, it is necessary to check hardware such as the detector to make sure there is no trouble therein by directly operating the metal analysis instrument. Such a problem occurs not only when debugging but also when installing.

Thus a major object of the invention is to provide a debugging method for an analysis instrument which makes it possible to debug a user's analysis instrument from a remote developer's premise.

Another object of the invention is to provide a monitoring method for an analysis instrument which is capable of remotely checking the hardware of a detecting system as to determine whether trouble exists or not.

The debugging method of the invention can be applied to an analysis instrument provided with a feeder which supplies samples to be analyzed to a detector, with the detector analyzing the sample and outputting a detected value, and a microcomputer. The microcomputer processes the detected value according to contents stored in a storage device of the microcomputer, thereby calculating an analysis value. According to the debugging method for the analysis instrument, a debugging computer is connected to the microcomputer of the analysis instrument via remote communication means and is checked as to whether a problem exists in the detector or the feeder via the communication means. The content of the storage device for calculating the analysis value is then debugged by the debugging computer via the communication means.

According to the invention, the word "analysis" refers to determining a part or all of the chemical constituents of a substance qualitatively, or quantitatively. The "remote communication means" includes radio communication means as well as telephone circuitry which connects the microcomputer of the analysis instrument and the debugging computer. Also, the word "connect" refers to making a device accessible.

The word "bug" refers to an error in a program, or an error in a variable or function related to the program. "Debugging" refers to correcting a bug. "Content of storage device" to be debugged refers to the arithmetic operation program stored in the storage device or data or function used in executing the arithmetic operation program. Data and function used in executing the arithmetic operation program include correction coefficients intrinsic to the analysis instrument, gas correction coefficients and calibration curves.

According to the invention, an analysis instrument can be debugged via communication means. Consequently, it is not necessary to dispatch a programmer to the site where the analysis instrument is used, or to reproduce the problem on a (developer's) analysis instrument at the programmer's site. It is also economical because transportation expenditure is not incurred after correction. Also, because there is no time spent in dispatching personnel or sending the debugged object, troubles can be corrected quickly.

Also according to the invention, there is a check as to whether trouble exists in the detector or the feeder before debugging the contents of the storage device. As a result, errors in the analysis value can be limited to bugs in the contents of the storage device, and, therefore, unnecessary time and labor can be eliminated.

In a preferred embodiment of the invention, intermediate variables which are handled after the detected value is obtained and before the analytical value is obtained are sent to an output device of the debugging computer via the communication means. In this embodiment, the intermediate variables which cannot be sent by the microcomputer of the analysis instrument can be sent to an output device of a debugging personal computer. Therefore, the location of a bug in the software during the analysis process can be precisely determined.

It is also unnecessary to add a debugging program, which is used for checking the intermediate variables irrelevant to the essential functions of the analysis instrument, to the contents of the storage device of the user's microcomputer. This makes it possible to reduce the cost of the analysis instrument of the invention.

The analysis instrument to which the monitoring method of the invention is applied has a furnace for generating gas from a metal which includes impurities, a gas concentration detector which detects the impurities in the gas and outputs a detected value, a feeder which supplies the gas generated in the furnace to the gas concentration detector, a microcomputer and multiple types of detecting means for checking operation status. The microcomputer processes, according to the detected value from the gas concentration detector, an arithmetic operation program stored in a storage device, thereby calculating the concentration of the impurity element included in the metal and outputs the value of concentration. The detecting means for checking operation status checks the operation status of each component device of the gas concentration detector and the feeder. The monitoring method of the analysis instrument is comprised of a step of connecting a monitoring computer to the microcomputer via remote communication means, a step of transmitting testing information from the detecting means for checking operation status via the communication means to the monitoring computer, and a step of sending the testing information to an output device of the monitoring computer.

According to the invention, the method for "generating gas from a metal" includes, in addition to the generation of gas through chemical reaction such as burning of the metal in a furnace, generation of gas through a change in status by evaporating substances included in the metal.

"The detecting means for checking operation status" is not limited to detectors and measuring devices installed in the component devices of the metal analysis instrument, but also includes means for judging the operation status from preset values stored in the microcomputer, analysis history and other information.

According to the invention, the detecting means for checking operation status is designed to check the operation status of the detector and the feeder of the metal analysis instrument, and the testing information from the detecting means for checking operation status can be sent to a personal computer via the communication means. Therefore, it is possible to check through a (developer's) personal computer at the site, as to whether trouble exists in the component devices of the analysis instrument before debugging or installation of the software. As a result, unnecessary time and labor can be eliminated. That is, according to this monitoring method, because a check exists as to whether trouble exists in the component devices of the analysis instrument before debugging the software, errors in the analysis value can be limited to bugs in the analytical software. Therefore, unnecessary time and labor can be eliminated.

Also, it is not necessary to dispatch personnel or send a storage medium when carrying out on-line debugging or installation for the metal analysis instrument. Therefore, trouble can be corrected quickly and costs for debugging and other operations can be reduced.

The monitoring method also makes it possible to predict trouble in the metal analysis instrument by periodically sending the testing information to a personal computer, making maintenance easier.

BRIEF DESCRIPTION OF THE DRAWINGS

The invention will be understood more fully by reading the following description on preferred embodiments while making reference to the accompanying drawings. However, it should be noted that the embodiments and drawings are for mere illustrative and explanatory purposes, not used to specify the scope of the invention. The scope of the invention is defined only by the claims. In the accompanying drawings, identical numerals used in different drawings represent identical or corresponding components.

DESCRIPTION OF THE INVENTION

One embodiment of the invention will now be described below with reference to the accompanying drawings.

Figure 1:
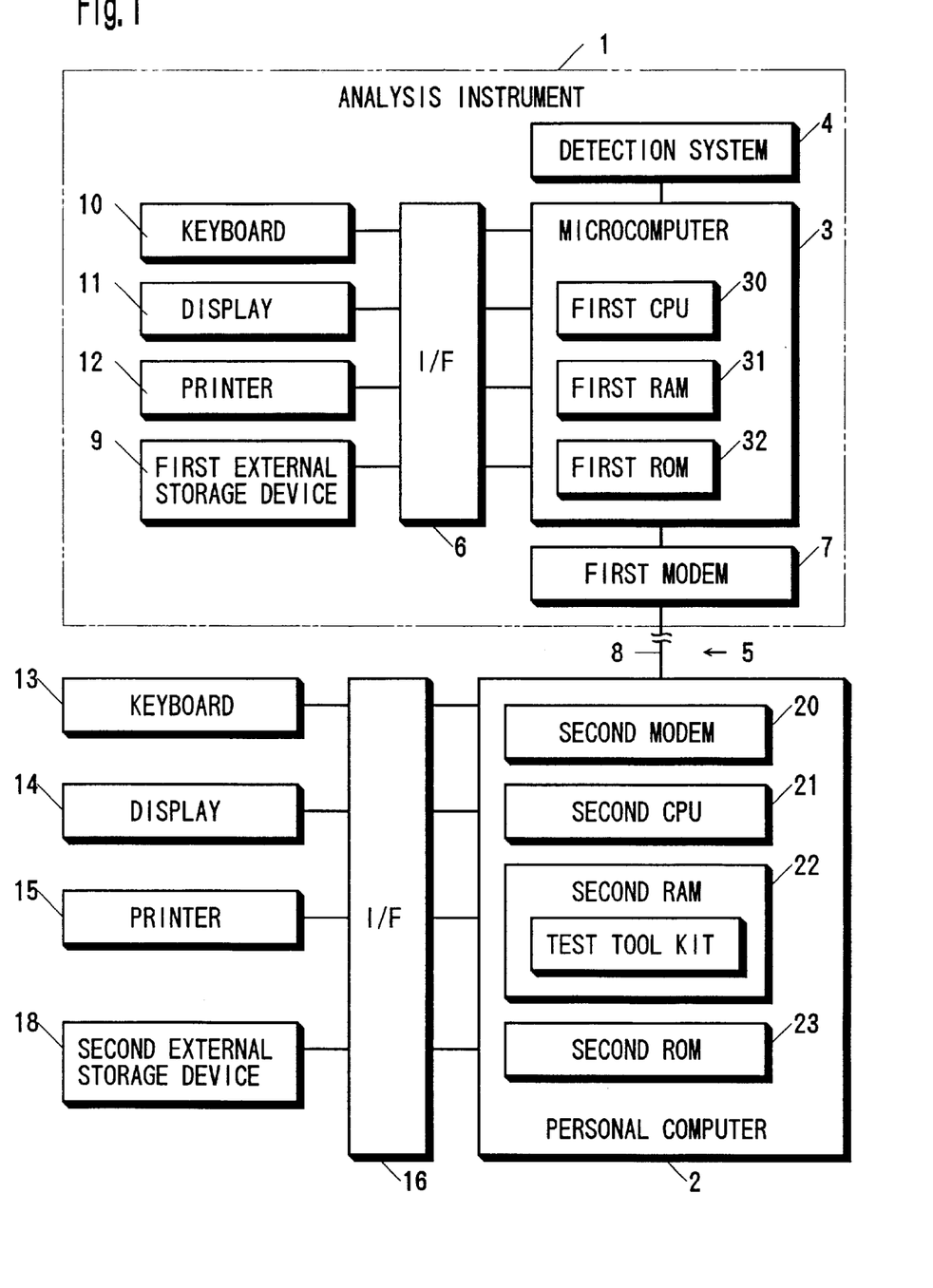
FIG. 1 is a schematic diagram of a system for debugging and monitoring according to a first embodiment of the invention.

In FIG. 1, an analysis instrument 1 such as the metal analysis instrument is provided on a user side. On the side of a developer, a personal computer 2 is provided as a computer for debugging and monitoring. The analysis instrument 1 has a microcomputer 3 and a detection system 4. The microcomputer 3 of the analysis instrument 1 is connected to the personal computer 2 via a first modem 7, a public access networks 8 and a second modem 20. The personal computer 2 has the second modem 20 incorporated therein. The first modem 7, the public access networks 8 and the second modem 20 constitute remote communication means 5 in the invention.

The microcomputer 3 and the personal computer 2 each have communication software (as commercially available), installed therein. For example, PC.ANYWHERE of SYMANTEC Ltd. can be used.

Figure 2:
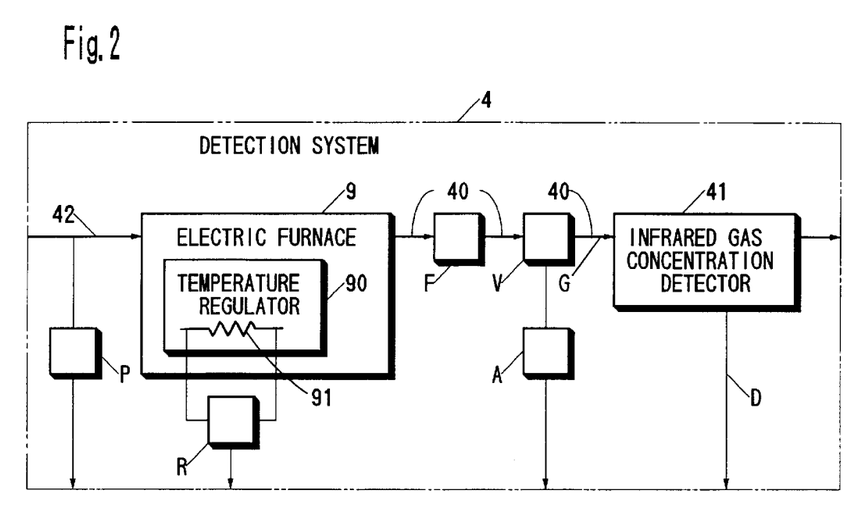
FIG. 2 is a schematic diagram of a detection system of an analysis instrument.

In FIG. 2, the detection system 4 of the analysis instrument 1 has an electric furnace 9 for burning metals. The electric furnace 9 receives supply of oxygen from an oxygen supply passage 42. When a metal is burned in the electric furnace 9, combustion gas G is generated. The combustion gas G passes a flue 40 and is introduced into an infrared gas concentration detector 41, so that concentrations of the $CO_2$ and $SO_2$ contents in the combustion gas G are measured. This type of metal analysis instrument is disclosed in U.S. Pat. No. 5,452,881 and German Patent No. DE 42 33 641 C2. Detected value D from the gas concentration detector 41 is sent to the microcomputer 3 of FIG. 1.

In FIG. 1, the microcomputer 3 has a first CPU 30, a first RAM 31 and a first ROM incorporated therein. Connected to the microcomputer 3 are a first external storage device 9, a keyboard 10, a display 11 and a printer 12.

The keyboard 10 is provided for the input of parameters required to analyze element concentrations and setting for statistical processing. The parameters include analysis time, calibration coefficients and coefficients of a calibration curve. The display 11 and the printer 12 display or print out various preset values and the result of analysis.

Figure 3:
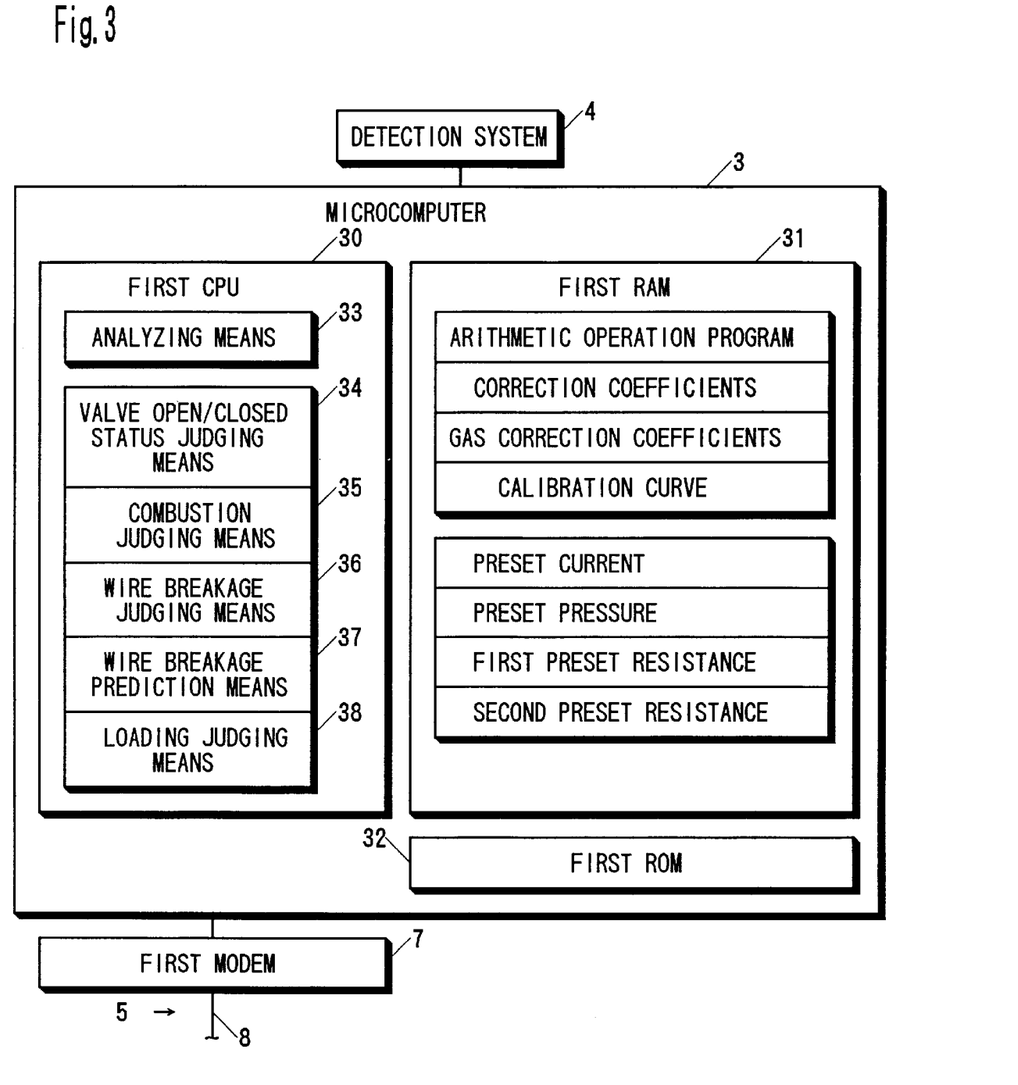
FIG. 3 is a schematic diagram of a microcomputer, particularly illustrating functions thereof.

As shown in FIG. 3, the first RAM 31 holds the arithmetic operation program for calculating the analysis value, correction coefficients intrinsic to the analysis instrument, gas correction coefficient, calibration curve, etc., stored therein. The first CPU 30 has an analyzing means 33. The analyzing means 33 processes the detected value D of the detecting system 4 according to the arithmetic operation program stored in the first RAM 31, the correction coefficients and the calibration curve, thereby calculating the analysis value.

In FIG. 2, the detecting system 4 has an ammeter A, a pressure sensor P and a resistance meter R, etc., installed therein. The ammeter A, the pressure sensor P and the resistance meter R, respectively, constitute part of the detecting means for checking operation status of the invention.

Installed in the flue 40 is a valve (e.g., a solenoid valve) V. The ammeter A measures the current flowing for operating the valve V. The ammeter A outputs measured value of current to the microcomputer 3. The pressure sensor P detects the pressure in the oxygen supply passage 42 and outputs the detected value of pressure to the microcomputer 3. The resistance meter R measures the resistance of a heater 91 of a temperature regulator 90 of the electric furnace 9 and outputs the measured resistance to the microcomputer 3.

The first RAM 31 of FIG. 1 holds data such as preset current, preset pressure, first preset resistance $\Omega$ 1 and second preset resistance $\Omega$ 2 ($\Omega$ 2<$\Omega$ 1) stored therein. The first CPU 30 has judging means such as a valve status-judging means 34, combustion-judging means 35, wire breakage judging means 36, wire breakage prediction means 37 and loading judging means 38. These judging means 34 through 38 judge the devices of the detection system 4 as to whether trouble exists or not, and constitute part of the detecting means for checking operation status.

The valve status-judging means 34 compares the preset value of current stored in the first RAM 31 and the current measured by the ammeter A of FIG. 2, thereby judging the status of the valve V. The valve status-judging means 34 (FIG. 1) indirectly determines, for example, that the valve V is open and, consequently, that the combustion gas G is being introduced into the infrared gas concentration detector 41 in case the measured current is greater than the preset current.

The combustion-judging means 35 of FIG. 3 compares the preset value of pressure stored in the first RAM 31 and the pressure measured by the pressure sensor P as to whether a specified amount of oxygen is consumed or not in the electric furnace 9 (FIG. 2), thereby indirectly judging the combustion status. When the preset value of pressure is lower than the measured pressure, for example, the combustion-judging means 35 judges that the specified amount of oxygen is consumed in the electric furnace 9, thereby judging that the metal is burning in the electric furnace 9.

The wire breakage-judging means 36 compares first preset resistance stored in the RAM 31 and the resistance measured by the resistance meter R, thereby judging wire breakage of the heater 91 (FIG. 2). The wire breakage-judging means 36 indirectly judges, for example, when the measured resistance is higher than the first preset resistance $\Omega$ 1, and that the heater 91 is broken.

The wire breakage-prediction means 37 compares the first preset resistance $\Omega$ 1 and the second preset resistance $\Omega$ 2 stored in the RAM 31 with the value of resistance measured by the resistance meter R, thereby predicting the breakage of the heater 91. The wire breakage-prediction means 37 indirectly judges that the heater 91 is about to break, for example, when the measured resistance is lower than the first preset resistance $\Omega$ 1 and higher than the second preset resistance $\Omega$ 2.

The loading-judging means 38 judges whether a filter F installed in the flue 40 is loaded or not. For example, the loading-judging means 38 counts the number of analyses which have been performed and, when the number reaches a specified number, judges that the filter F of the flue 40 is loaded. The number of analyses which have been counted by the loading-judging means 38 does not necessarily agree with the actual number of analyses executed, and, for example, a value of 2 may be added upon one analysis depending on the sample analyzed. After the filter has been replaced, the count of analyses is cleared to 0.

As shown in FIG. 1, the personal computer 2 has, in addition to the second modern 20, second CPU 21, a second RAM 22 and a second ROM 23 incorporated therein. Connected the personal computer 2 are a keyboard 13, a display 14, a printer 15 and a second external storage device 18.

The second RAM 22 holds a test tool kit (i.e., a test program) stored therein. The test tool kit is used in debugging the analytical software stored in the microcomputer 3 of the analysis instrument 1. The test tool kit is transmitted from the personal computer 2 to the user's microcomputer 3 and is then started, thereby sending the intermediate variables and internal variables calculated by the first CPU 30 to the personal computer 2.

The internal variable refers to a preset value of waiting time between successive operations of devices of the detecting system 4 during analysis and other variables. The intermediate variables are the values handled after the detected value D (FIG. 2) is obtained and before the analysis value is obtained.

The keyboard 13 is used for the input operations required for communication, file transfer and debugging. The display 14 and the printer 15 display or print the result of judgment by the detecting means for checking operation status and information required for debugging such as the intermediate variables and the internal variables. The display 14 and the printer 15 also display or print the information required for communication and file transfer.

The first and the second external storage devices 9 and 18 of FIG. 1 store the programs for operating the devices 33 through 38 of the first CPU 30 of the microcomputer 3 and programs and data to be loaded onto the first RAM. That is, contents stored in the second external storage device 18 are transferred to the first external storage device 9 via the communication means 5 by using a method of file transfer to be described later, and the information transferred to the first external storage device 9 is stored in the first RAM 31 of the microcomputer 3.

Figure 4:
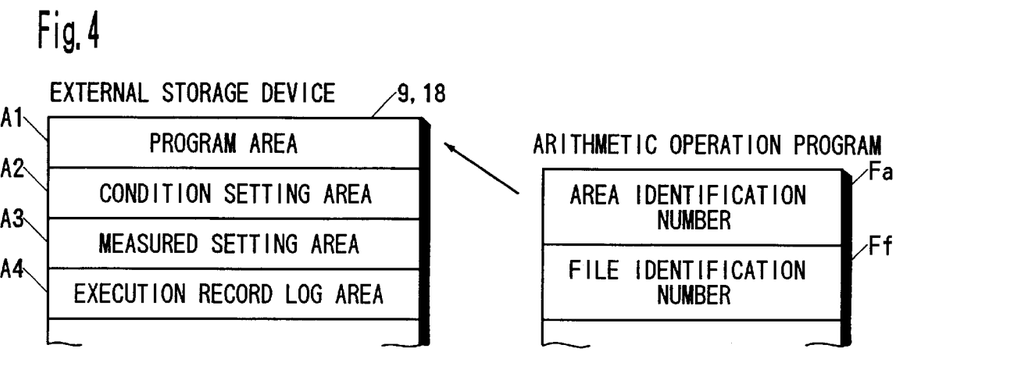
FIG. 4 is a schematic diagram showing the contents of an external storage medium and contents of an arithmetic operation program.

The first external storage device 9 comprises, for example, a hard disk. As shown in FIG. 4, the first external storage device 9 has a program area A1, a condition setting area A2, a measured data area A3 and an execution record log area A4.

The word "area" here refers to a space of memory device where files are stored. "The program area" refers to an area where files of arithmetic operation programs which define procedures such as measurement, arithmetic operations and statistical operations are stored. "The condition setting area" refers to an area for storing analysis time, data and functions (calibration coefficient, correction coefficient, calibration curve) used in executing the arithmetic operation program. "The measurement data area" refers to an area for storing files of the results of analysis (measured data). Results of analysis include analysis value, date of measurement, measurement time and number of measurements. "The execution record log area" refers to an area for storing log files of past execution records. "The execution record" refers to the history of operations, execution time, operating time, analysis time, operation mode, total number of analyses and history of errors, etc.

For example, as shown in FIG. 4, the files stored in the areas A1 through A4 have area identification numbers (area identification information) Fa and file identification numbers Ff assigned thereto. "The area identification number Fa" is an identifier used to identify an area A1 to A4 for storing a file. "The file identification number Ff" is a file name. It is prohibited that two or more files of the same file identification number Ff exist in the same area A1 to A4.

When a file is transferred from the second CPU 21 of FIG. 1 via the communication means 5, the first CPU 30 stores the file in the first RAM 31. Then the first CPU 30 reads the area identification number Fa assigned to the file and finds an area corresponding to the area identification number Fa in the first external storage device 9.

The first CPU 30 determines whether to replace a file or store a new file, according to the file identification number Ff. This is done by regarding the file in the first external storage device 9 as an existing file when there is a file of the same file identification number Ff in the specified area of the first external storage device 9, and regarding a file sent from the personal computer 2 as a new file.

The second external storage device 18 consists of, for example, a hard disk, and has four areas A1, A2, A3, A4 similar to the first external storage device 9 connected to the microcomputer 3.

CPU and other components which are preferably used in the invention are listed below in Table I.

TABLE I

| Component | Developer | Model | Specification |
|---|---|---|---|
| 1st CPU | NEC | V53 | |
| 1st RAM 31 | NEC | | 4 Mbits |
| 1st RAM 32 | Fujitsu | 29PO40 | 4 Mbits |
| Interfaces 6, 16 | | RS232C | |
| Modems 7, 20 | Panasonic | | 56 kbps |
| Personal computer 2 | IBM | | |
| 2nd CPU 21 | INTEL | Pentium 2 | 300 MHz |
| 2nd RAM 22 | IODATA | SIMM | 32 Mbytes |
| External storage devices 9, 18 | Quantum | | 2 Gbytes |
| OS | | Windows 95 | |

Figure 5:
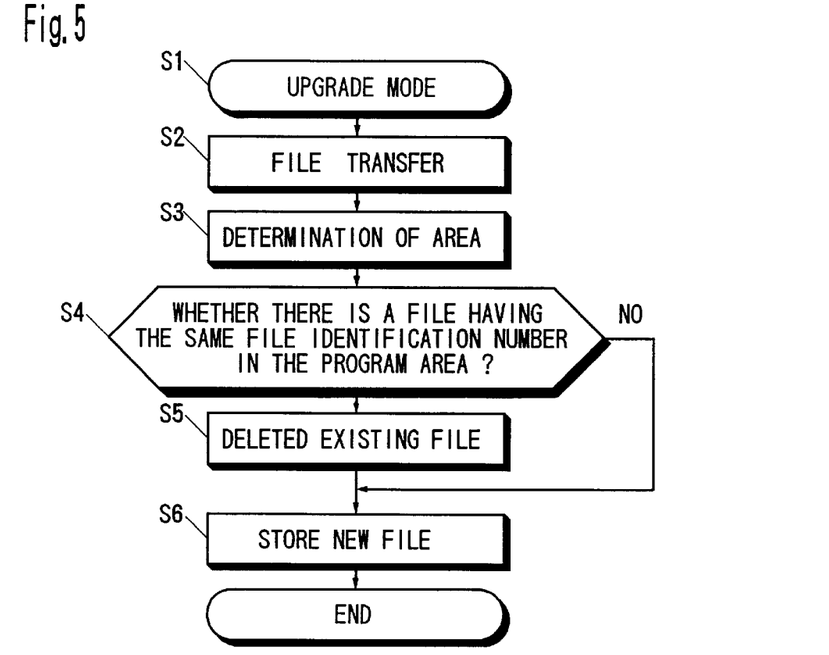
FIG. 5 is a flow chart showing a procedure for upgrading software.

Now the operation of installation for the analysis instrument 1 will be described below taking the case of an upgrade as an example, with reference to the flow chart of FIG. 5.

First, in step S1, the personal computer 2 of FIG. 1 is set in upgrade mode, while the personal computer 2 and the microcomputer 3 are connected via the communication means 5.

In step S2, the second CPU 21 of the personal computer 2 reads out a file of an arithmetic operation program from the program area A1 of the second external storage device 18 and stores the file in the second RAM 22. Then the arithmetic operation program is sent to the microcomputer 3 via the communication means 5 and is stored in the first RAM 31 by the first CPU 30 of the microcomputer 3.

In the next step S3, the first CPU 30 reads the area identification number Fa assigned to the arithmetic operation program which is stored in the first RAM 31, and determines the program area A1 which is the area corresponding to the area identification number Fa.

Then the process proceeds to step S4 where the first CPU 30 reads the file identification number Ff assigned to the arithmetic operation program and determines whether there is a file (program) having the same file identification number Ff in the program area A1 of the first external storage device 9. In the case where a same file having the file identification number Ff is found in the program area A1, the process proceeds to step S5 and, otherwise, proceeds to step S6.

In step S5, the file having the same file identification number Ff in the first external storage device 9 is regarded as an old file and the old file is deleted. In the next step S6, the first CPU 30 reads out the arithmetic operation program from the first RAM 31 and stores the arithmetic operation program in the program area A1 of the first external storage device 9 which has been determined in step S3. When upgrading a data file or functions used in the execution of the arithmetic operation file, the procedures from step S2 through step S6 are repeated.

In the case of a first installation, not upgrading, the personal computer 2 of FIG. 1 instructs the first CPU 30 of the microcomputer 3 to prepare areas of specified sizes in the first external storage device 9 connected to the microcomputer 3. Then, after the file transfer in step S2 and determination of area in step S3, the file is stored in step S6. The same procedure is also repeated in the order of step S2, step S3 and step S6, for a data file or a function file.

Figure 6:
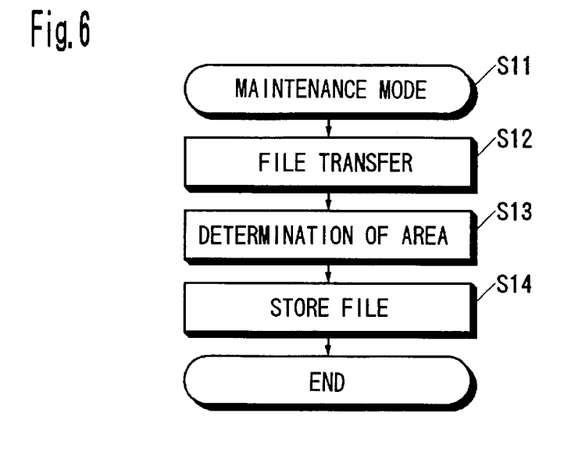
FIG. 6 is a flow chart showing a procedure of maintenance service.

In order to carry out maintenance or debugging of software of the analysis instrument, a file is transferred from the analysis instrument 1 to the personal computer 2. Specifically, as shown in the flow chart of FIG. 6, after setting the microcomputer 3 in maintenance mode, a file of past operation records is read from the execution record log area A4 of the first external storage device 9 in step S11. Then after transferring the file to the personal computer 2 in step S12, an area is determined in step S13, and the file is stored in the second external storage device 18 in step S14.

When a file of the results of analysis, or the like, is necessary, the file stored in the measured data area A3 of the first external storage device 9 of the analysis instrument 1 shown in FIG. 4 is transferred to the personal computer 2.

Now the method of debugging the metal analysis instrument will be described below.

First, the first CPU 21 sends the test tool kit stored in the second RAM 22 via the communication means 5 to the microcomputer 3. Then, prior to debugging the analytical software, the first CPU 30 of the microcomputer 3 monitors the component devices of the analysis instrument 1 and detects the devices with trouble to obtain testing information. The testing information is obtained from the judging means 33 through 38 of FIG. 3 as described previously.

Specifically, the valve status-judging means 34 indirectly judges whether the combustion gas G is introduced into the infrared gas concentration detector 41 or not. The combustion-judging means 35 indirectly judges whether a metal is burning in the electric furnace 9 or not. The wire breakage-judging means 36 indirectly judges whether the heater 91 is broken or not. The wire breakage prediction means 37 indirectly judges whether the heater 91 is about to break or not. These judgments are made by operating the relevant device individually or actually analyzing the metal.

The testing information is sent to the personal computer 2 via the communication means 5 of FIG. 1. After making sure that no trouble exists in the devices by using the testing information, the operator debugs the analytical software as follows.

The operator first operates the keyboard 13 to start the test tool kit which has been sent. This causes analysis of the metal to be carried out. That is, when the metal is burned and combustion gas G is generated, the combustion gas G is sampled into the infrared gas concentration detector 41 every 10 msec, thereby obtaining detected value D. The detected value D is corrected with the correction coefficients intrinsic to the device and the gas correction coefficient. The corrected value is then converted to a concentration value according to the calibration curve. Intermediate variables generated in various steps before the conversion to concentration are output by the test tool kit every time they are generated, to be sent to the personal computer 2 via the communication means 5.

Then the operator finds a bug from the intermediate variables and accordingly corrects the arithmetic operation program used in the analysis. The corrected arithmetic operation program is sent from the personal computer 2 to the microcomputer 3 via the communication means 5 according to the file transfer procedure. Thus, the contents stored in the first external storage device 9 are rewritten, and debugging is completed.

During installation, troubles can be detected similarly by monitoring the devices of the analysis instrument 1 in advance. Furthermore, troubles such as wire breakage of the heater 91 can be predicted by periodically sending the testing information to the monitoring computer.

The preferred embodiment of the invention has been described above by making reference to the accompanying drawings. Persons skilled in the art will easily comprehend various modifications and corrections which can be made within the self-evident scope of the invention, by reading this specification.

Therefore, such modifications and corrections shall be regarded as those which belong to the scope of the invention specified by the claims. For example, according to the invention, the detecting means for checking operation status may be constituted only from a sensor installed in the detecting system 4. In this case, the testing information is taken into the microcomputer 3 and is sent from the microcomputer 3 to the personal computer 2 via the communication means 5.

Figure 7:
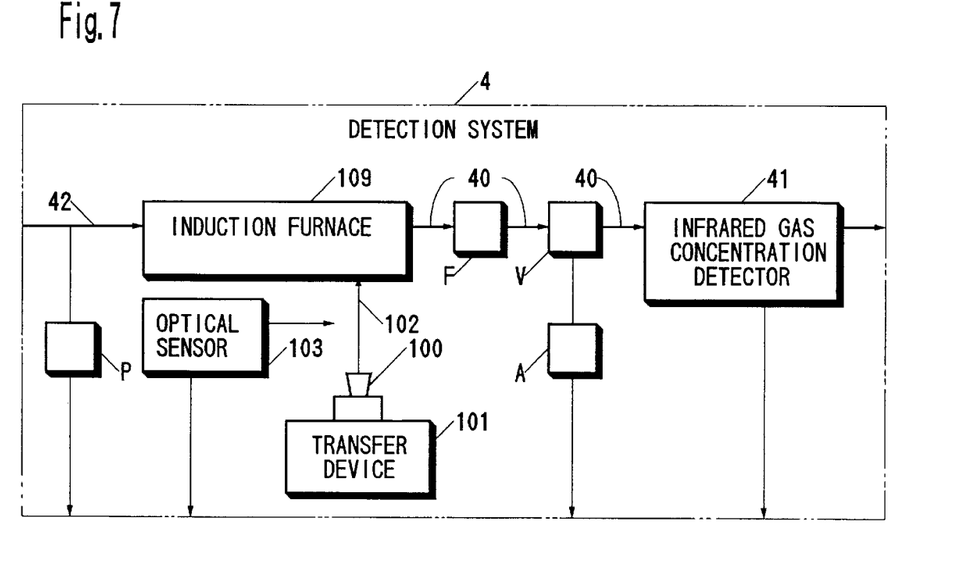
FIG. 7 is a schematic diagram showing another detection system to which the method of the invention applies.

In the case of the detecting system 4 having a transfer device 101 which transfers a crucible 100 into an induction furnace 109 as shown in FIG. 7, for example, an optical sensor 103 is provided for detecting the crucible 100 or part of the transfer device 101 passing through a transfer path 102, with ON/OFF information detected by the optical sensor 103 being output to the first CPU 30 of the microcomputer 3. The first CPU 30 indirectly judges whether the crucible 100 has been transferred into the induction furnace 109 or not according to the ON/OFF information sent from the optical sensor 103.

Figure 8:
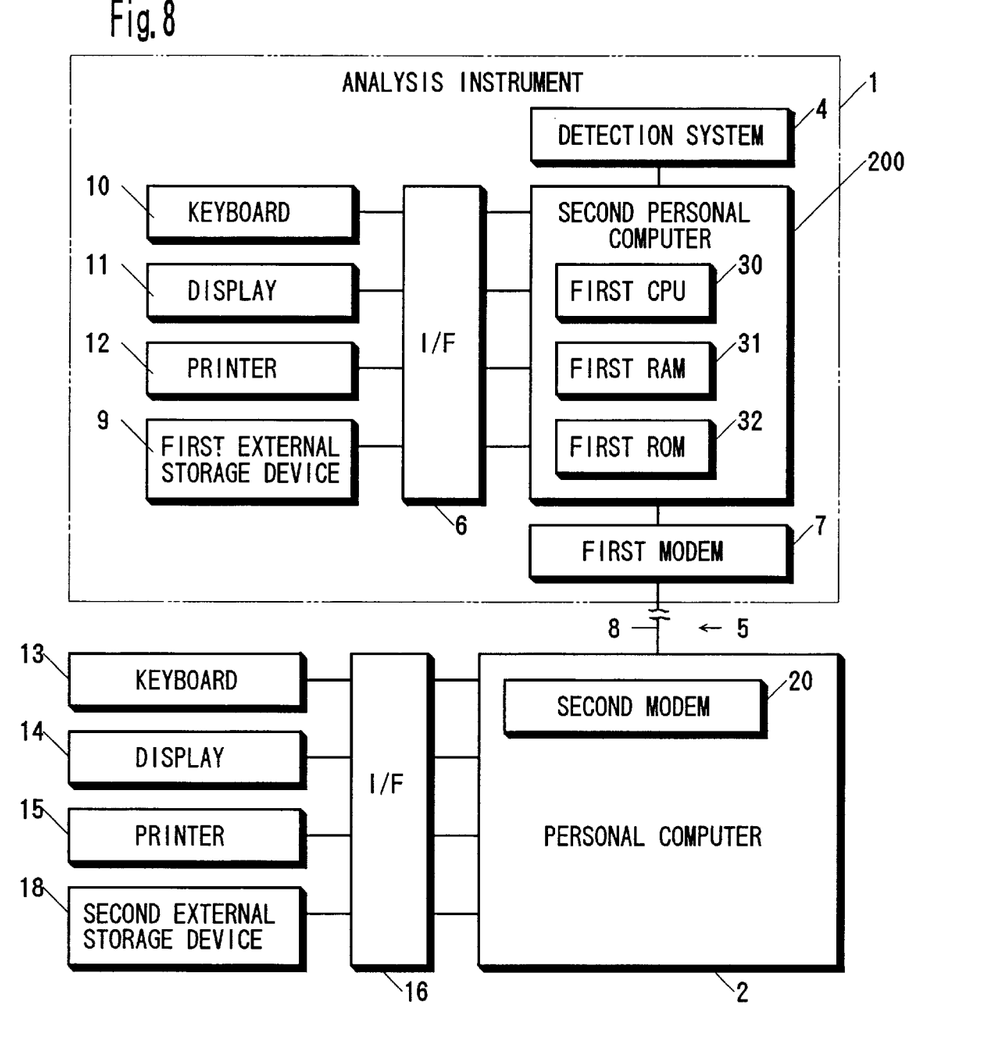
FIG. 8 is a schematic diagram of a system for debugging and monitoring according to a second embodiment of the invention.

Also according to the invention, a second personal computer 200 having the microcomputer 3 and the first modem 7 incorporated therein and the analysis instrument 1 having the detection system 4 connected to the second personal computer 200 may be used.

The communication means 5 in the embodiment described above is constituted from the second modem 20 incorporated in the personal computer 2, the public access networks 8 and the first modem 7 connected to the microcomputer 3. However, according to the invention, the method of one-to-one connection of the computers may be replaced by a computer network connecting multiple computers or by the Internet and a LAN. Also according to the invention, a public access networks which includes radio communication such as mobile telephones may be used instead of ordinary telephone circuitry. Further according to the invention, a digital public access network instead of the analog public access network 8, and a terminal adapter, instead of the modems 20 and 7, may be used.

What is claimed is:

1. A method for debugging an analysis instrument, the analysis instrument including: a detector;
    a feeder for supplying a sample to be analyzed to the detector, the detector for detecting the sample and providing an output of a detected value; and
    a microcomputer with a storage device, the microcomputer for processing and calculating an analysis value according to the detected value from the detector and contents of the storage device;

said method comprising the steps of:
    connecting a debugging computer to the microcomputer of the analysis instrument via remote communication means;
    checking the detector and the feeder as to whether trouble exists therein by means of the debugging computer via the communication means; and
    debugging the contents of the storage device with the debugging computer via the communication means.

2. A debugging method for removing bugs from an analysis instrument, the analysis instrument including:
    an analyzing detector for detecting a sample and providing an output of detected value;
    a microcomputer for processing and calculating an analysis value according to the detected value from the analyzing detector and on the basis of an arithmetic operation program for calculation of the analysis value stored in a storage device;
    a feeder for supplying the sample to be analyzed to the analyzing detector; and
    a plurality of detecting means for respectively checking the operation status of each device of the analyzing detector and the feeder;

said debugging method comprising the steps of:
    connecting a debugging computer to the microcomputer via remote communication means;
    sending testing information from the detecting means for checking operation status via the communication means to an output device of the debugging computer to determine whether trouble exists in each device of the detector and the feeder; and
    debugging the contents of the storage device with the debugging computer via the communication means.

3. The debugging method for the analysis instrument according to claim 2, further comprising the step of:
    sending intermediate variables after the detected value is obtained and before the analysis value is obtained to the output device of the debugging computer via the communication means, so that the debugging can be done according to the intermediate variables.

4. The debugging method for the analysis instrument according to claim 2, wherein:
    the storage device of the microcomputer of the analysis instrument and the storage device of the debugging computer are provided with program areas for storing arithmetic operation program files, condition setting areas for storing data and function files used when executing the arithmetic operation program, measured data areas for storing files of results of analysis;
    the files stored in each area with area-identifying information for specifying an area to store the file;
said debugging method further comprising the steps of:
    transferring files via the remote communication means;
    reading the area-identifying information assigned to the files after the file transfer; and
    storing files in the area corresponding to the area identifying information and transferring the file.

5. The debugging method for the analysis instrument according to claim 2, wherein said debugging step comprises the step of:

debugging the contents of the storage device when installing the analysis instrument.

6. A monitoring method for checking the operation status of a metal analysis instrument, the metal analysis instrument including:

a furnace for generating gas from a metal including impurities;

a gas concentration detector for detecting the impurities in the gas and giving an output of detected value;

a feeder for supplying the gas generated in the furnace to the gas concentration detector;

a microcomputer for processing, according to the detected value from the gas concentration detector, an arithmetic operation program stored in a storage device for calculating analysis value, thereby calculating concentrations of the impurity elements in the metal and giving an output of element concentration; and multiple types of detecting means for checking the operation status of each device of the gas concentration detector and the feeder;

said monitoring method comprising the steps of:

connecting a monitoring computer to the microcomputer via remote communication means;

sending testing information from the detecting means for checking operation status to the monitoring computer via the communication means; and sending the testing information to an output device of the monitoring computer.

7. The monitoring method for the analysis instrument according to claim 6, wherein:

the feeder has a flue for introducing the gas into the gas concentration detector and a valve for opening and closing the flue; and one of the detecting means for checking operation status is a detecting means for detecting open or closed status of the valve;

said monitoring method further comprising the step of:

determining whether the valve is opened or closed.

8. The monitoring method for the analysis instrument according to claim 6, wherein:

the furnace consists of a combustion furnace for burning metals; and one of the detecting means for checking operation status is a detecting means for detecting whether the metal is burning in the combustion furnace or not;

said monitoring method further comprising the step of:

determining whether metal is burning in the combustion furnace.

9. The monitoring method for the analysis instrument according to claim 6, wherein:

the analysis instrument has a temperature regulator for regulating the temperature in the furnace; and one of the detecting means for checking operation status measures the resistance of a heater of the temperature regulator;

said monitoring method further comprising the step of:

measuring the resistance of the heater of the temperature regulator.

10. The monitoring method for the analysis instrument according to claim 6, wherein:

the analysis instrument has a transfer device for transferring a crucible containing the metal placed therein to the furnace; and one of the detecting means for checking operation status is a detecting means for detecting the transfer of the crucible by the transfer device;

said monitoring method further comprising the step of:

determining whether the crucible has been transferred to the furnace.

* * * * *